United States Patent

Peehs et al.

[11] 4,077,839
[45] Mar. 7, 1978

[54] FUEL ASSEMBLY FOR GAS-COOLED NUCLEAR REACTORS

[75] Inventors: Martin Peehs, Bubenreuth; Manfred Hünner, Erlangen, both of Germany

[73] Assignee: Kraftwerk Union Aktiengesellschaft, Mulheim (Ruhr), Germany

[21] Appl. No.: 505,259

[22] Filed: Sep. 12, 1974

[30] Foreign Application Priority Data

Sep. 28, 1973  Germany .............................. 2348947

[51] Int. Cl.² ................................................ G21C 3/16
[52] U.S. Cl. ........................................ 176/78; 176/37
[58] Field of Search ................ 176/68, 78, 79, 37, 176/19 LD, 58

[56] References Cited

U.S. PATENT DOCUMENTS

| 3,218,237 | 11/1965 | Stoker et al. | 176/78 |
| 3,297,540 | 1/1967 | William et al. | 176/78 |

Primary Examiner—Samuel W. Engle
Assistant Examiner—S. A. Cangialosi
Attorney, Agent, or Firm—Kenyon & Kenyon, Reilly, Carr & Chapin

[57] ABSTRACT

The individual fuel rods of a fuel assembly are connected to a fission gas exhaust system via perforated end caps. For this purpose, the perforated end caps are provided with external threads and screwed into a rod holding plate of the fuel assembly. In addition to the attachment thus provided, a tight connection to the canals of the fission gas exhaust system, which are built into the rod holding plate, is accomplished thereby at the same time.

1 Claim, 4 Drawing Figures

FUEL ASSEMBLY FOR GAS-COOLED NUCLEAR REACTORS

BACKGROUND OF THE INVENTION

The present invention concerns a fuel assembly for gas-cooled nuclear reactors, particularly fast breeders, which consists of a multiplicity of fuel rods which are fastened to a rod holding plate provided with passage holes for the coolant, and are each connected via a perforated end cap to a fission gas exhaust system. Such fuel assemblies are called in the literature also vented fuel assemblies. In them, the fission gases therefore do not remain in the interiors of the respective fuel rods, but are led off to a fission gas collecting system so that no excessive or undesirable overpressure can build up in the interior of the fuel rods and a possible poison effect of the fission gases remains within limits.

According to the prior state of the art, the individual fuel rods of such a fuel assembly are connected with the upper fuel rod holding plate of the fuel assembly by a screw connection or by soldering or welding and the venting canals in the end caps are soldered to a separate gas conduction grid. For carrying out these soldering operations, the fuel assembly must be brought at least partially into a soldering oven, so that all the solder joints are made simultaneously.

This manufacturing method not only requires a large expenditure of technical means, but also makes replacement of individual fuel rods difficult in case a soldered connection should become leaky, for instance.

The problem therefore arises to simplify these fastening and joining techniques, to the extent possible, so that easy replaceability of individual fuel rods remains assured in all cases. This replaceability should, in particular, have no detrimental effect on the other fuel rods of the fuel assembly.

SUMMARY OF THE INVENTION

According to the invention, this problem is solved by the provision that the perforated end caps of the fuel rods are provided with external threads and are screwed into internally threaded recesses in the rod holding plate and are thereby connected at the same time to the fission gas exhaust system via canals or passages that are built into the rod holding plate. This means that the attachment of each fuel rod in the rod holding plate and, at the same time, the connection to the fission gas exhaust system, are accomplished in a single operation. As this is accomplished by means of a pure screw connection, adjacent joints are not affected thereby, and each fuel rod can be replaced individually easily and simply. The sealing is accomplished here via surfaces at the rod holding plate and the fuel rod end cap, which are pressed together by the screw connection. For this purpose, these surfaces are provided with a residual roughness of 4 to 16 μm, so that a plastic deformation of the projections on these surfaces causing the roughness, is made possible. The size of these sealing surfaces depends on the type and size of the thread that can be used design-wise. It is not necessary here to make the sealing surface conical; it has been found that sealing surfaces normal to the fuel rod axis assure excellent tightness of the connection, are easy to fabricate and cause practically no alignment problems.

BRIEF DESCRIPTION OF THE DRAWINGS

The preferred mode for carrying out the invention is illustrated by the accompanying drawings, in which.

DETAILED DESCRIPTION OF THE INVENTION

Figure 1:
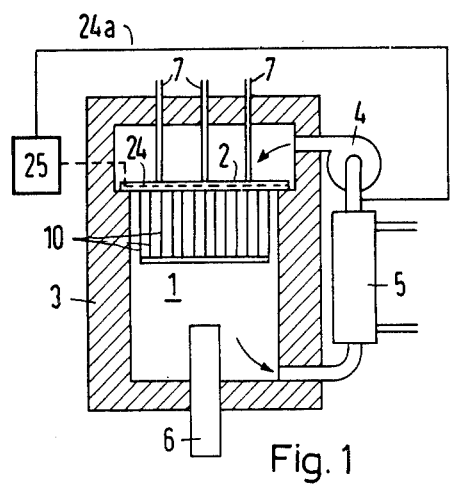
FIG. 1 schematically shows in vertical section a gas-cooled nuclear reactor.

FIG. 1 shows schematically the design of a gas-cooled nuclear reactor. The reactor core proper, 1, consists of a multiplicity of fuel assemblies 10, which are suspended from the support plate 2. This support plate 2 rests, for instance, in a reactor vessel 3 of prestressed reinforced concrete. The coolant flows through the reactor core 1 from the top to the bottom by means of a blower 4, emerges again in the lower half of the reactor vessel 3 and returns to the blower 4 via a heat exchanger 5. The secondary side of the heat exchanger 5 is connected, in a manner known per se, to a secondary loop, not shown. Below the reactor core 1 there are the refueling machine 6, shown schematically, and above the reactor core, the control rod drives 7. The fission gas exhaust system is indicated by a dashed line 24, which leads to a gas exhaust and fission gas separation equipment 25. The purified exhaust gas is returned via a further line 24a to the suction side of the blower 4.

Figure 2:
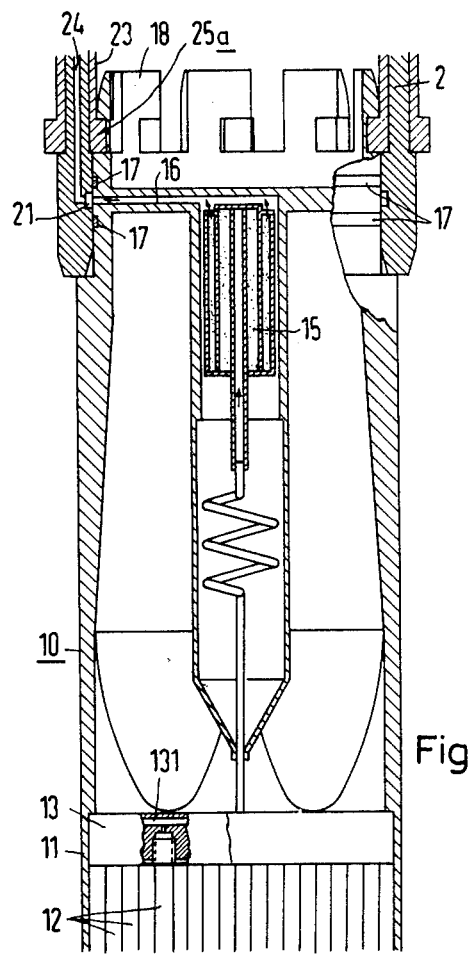
FIG. 2 shows in vertical section the upper end of a fuel assembly and the way it is positioned.

FIG. 2 shows a cross section through the upper part of a fuel assembly and its mounting at the support plate 2. The fuel assembly shown here has a casing of hexagonal cross section, which becomes a circular cross section toward the top for insertion into the usual hole in the support plate 2. This allows very close packing of the fuel assemblies in the reactor core, as is necessary, for instance, for a gas-cooled fast breeder reactor. The attachment of the fuel assembly 10 in the support plate 2 is accomplished in this example by a rotatable ring 23, which engages with projections 25a in corresponding, bayonet-shaped cutouts of the upper edge 18 of the fuel assembly. Any other kind of fastening can, of course, also be chosen. The fuel assembly itself consists of an enclosure 11 which, with the aid of the rod holding plate 13, functions as a support structure for the fuel rods 12. It serves further for conducting the reactor coolant, which flows through the fuel assembly, which is open at both ends, from the top to the bottom. The attachment of the fuel rods 12 in the rod holding plate 13 is shown in detail in FIGS. 3 and 4. This rod holding plate 13 is itself provided in a manner not shown with additional holes for the passage of the coolant, as is usual.

The fuel rods 12 themselves are screwed into this plate 13 and are thereby connected at the same time via their internal gas exhaust canals with the canals 131 for the exhaust of the fission gas, which are built into the rod holding plate. These canals connect in turn with a filter 15 above the fuel rod package, which in turn is connected via the line 16 with the gas exhaust canals 24 within the fuel assembly support plate 2. The filter consists, for instance, of a chamber filled with activated carbon and has the purpose to delay the discharge of the fission gases (the delay may be about a week) and to achieve thereby a decay of the radioactivity of part of these fission gases. In addition to the already mentioned fastening of the fuel assemblies 10 in the support plate 2, a sealing of the same by piston rings 17 is provided in this example. The gas exhaust line 16 mentioned ends between the two sealing rings 17 at the surface of the fuel assembly head and meets there with a circular groove 21, which in turn connects with the already mentioned gas exhaust canals 24. This connection of the gas exhaust line is therefore established automatically when the fuel assemblies are inserted by means of the refueling machine (not shown); no separate operation is required therefor.

Figure 3:
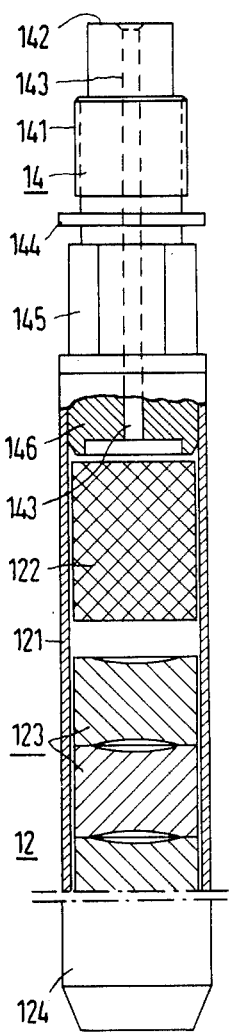
FIG. 3 is vertical section shows a fuel rod.

FIG. 3 now shows a fuel rod 12 such as is fastened in the rod holding plate 13. The fuel rod consists of the clad tube 121, which is closed off at both ends with the end caps 14 and 124 and contains in its interior the nuclear fuel, preferably in the form of pellets 123. Between this nuclear fuel and the upper and cap 14, a cartridge 122 of fission gas-absorbing material is frequently provided in addition, which like the filter 15 in the fuel assembly, delays the discharge of the fission gases.

The upper end cap 14 is provided, for the discharge of the fission gases, with a central hole 143, which opens at the outer or top sealing surface 142 at the end face of the end cap. For fastening the fuel rod, the end cap is furthermore provided with an external thread 141, for instance, a metric fine thread, as well as with a hexagonal section 145 for a suitable wrench. Between the two, a thin collar 144 is arranged which can be made to engage with a corresponding cutout of the rod holding plate in order to secure the fuel rod against rotation once it is installed.

Figure 4:
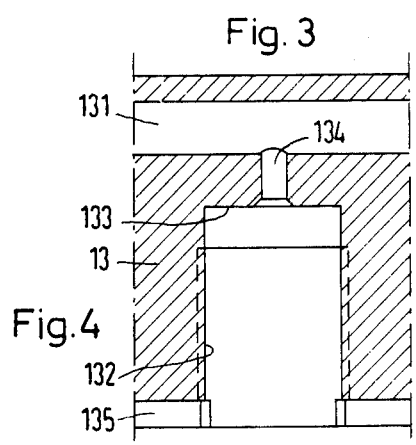
FIG. 4 in vertical section shows the internally threaded recess in the rod mounting plate.

This rod holding plate is shown in a section in FIG. 4. For the engagement of the collar 144, a slot 135 is provided, which runs diagonally to the internally threaded hole 132. Into the latter, the fuel rod end cap is screwed with its thread 141. The matching inner sealing surface is designated with 133, and a central hole 134 leads to the gas exhaust canal 131. It is important that the sealing surfaces 142 and 133, which are formed by the metal parts, have a certain residual roughness of 4 to 16 μm. The slight projections thus remaining are plastically deformed when the screw connection is tightened and provide an excellent seal. Even after the screw connection is loosened and retightened several times, the tightness of this connection remains assured, as always new roughness projections are deformed and take care of a perfect seal. Should, however, a slight leak occur at this point, this is of no practical importance, as leaks can also occur at the piston ring seal between the fuel assembly and the core support plate and the exhaust equipment 25 always conventionally takes care that the cooling gas can enter the gas exhaust lines to a small extent and is then returned purified to the cooling loop. A discharge of possibly radioactive fission gases into the coolant is thereby prevented practically with certainty.

The foregoing shows that it is possible by means of this relatively simple manner of fastening to install or also remove the individual fuel rods of a fuel assembly easily and to avoid disturbing already existing connections in the process. At the same time, a very reliable connection to the fission gas exhaust system is also established, which always heretofore required separate operations.

What is claimed is:

1. A gas-cooled nuclear reactor fuel assembly comprising a plurality of fuel rods each having an externally threaded end cap having an outer end surface having a fission outlet hole opening axially with respect to the end cap, and a fuel rod mounting plate having a plurality of internally threaded cylindrical recesses each having an inner end surface having a fission gas inlet hole opening axially with respect to the recess, said end caps being screwed into said recesses in each instance with said outer and inner end surfaces interengaging and said fission gas outlet and inlet holes mutually registered, said mounting plate having fission gas exhaust passages extending from said fission gas inlet holes, said outer and inner end surfaces being normal to the axes of the fuel rods and being made of metal machined with a residual roughness of from 4 to 16 microns, said roughness forming projections which are deformed by pressure exerted by said outer and inner surfaces against each other.

* * * * *